United States Patent
Takahashi et al.

(10) Patent No.: US 9,658,796 B2
(45) Date of Patent: May 23, 2017

(54) STORAGE CONTROL DEVICE AND STORAGE SYSTEM

(71) Applicant: FUJITSU LIMITED, Kawasaki-shi, Kanagawa (JP)

(72) Inventors: Hidenori Takahashi, Yokohama (JP); Emi Cho, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/048,351

(22) Filed: Feb. 19, 2016

(65) Prior Publication Data
US 2016/0259594 A1  Sep. 8, 2016

(30) Foreign Application Priority Data
Mar. 5, 2015  (JP) .................. 2015-043332

(51) Int. Cl.
*G06F 12/02*  (2006.01)
*G06F 3/06*  (2006.01)
*G06F 11/34*  (2006.01)

(52) U.S. Cl.
CPC .......... *G06F 3/0649* (2013.01); *G06F 3/0608* (2013.01); *G06F 3/0616* (2013.01); *G06F 3/0619* (2013.01); *G06F 3/0644* (2013.01); *G06F 3/0688* (2013.01); *G06F 3/0689* (2013.01); *G06F 11/34* (2013.01); *G06F 12/0246* (2013.01); *G06F 2212/1016* (2013.01); *G06F 2212/7206* (2013.01)

(58) Field of Classification Search
CPC ...... G01F 3/0619; G06F 11/34; G06F 3/0688; G06F 3/0644; G06F 3/0608; G06F 3/0616; G06F 3/0619; G06F 3/0689
USPC ..................................... 365/185.09
See application file for complete search history.

(56) References Cited

U.S. PATENT DOCUMENTS

| | | | |
|---|---|---|---|
| 2007/0271413 A1 | 11/2007 | Fujibayashi et al. | |
| 2008/0189477 A1 | 8/2008 | Asano et al. | |
| 2009/0259799 A1* | 10/2009 | Wong | G06F 12/0207 711/103 |
| 2017/0024277 A1* | 1/2017 | Wong | G06F 12/0207 |

FOREIGN PATENT DOCUMENTS

| | | |
|---|---|---|
| JP | 2007-115232 | 5/2007 |
| JP | 2008-192061 | 8/2008 |

\* cited by examiner

*Primary Examiner* — Pho M Luu
*Assistant Examiner* — Xiaochun L Chen
(74) *Attorney, Agent, or Firm* — Staas & Halsey LLP

(57) ABSTRACT

A storage control device includes a first storage device and a processor. The first storage device stores management information used for managing a variable area of storage regions of a second storage device in a storage apparatus. Each storage region is allocated to a main area or a spare area. The variable area includes storage regions allocated to the spare area and allocatable to the main area. The processor acquires, from the storage apparatus, information on numbers of times of Read processing on the second storage device and numbers of times of Write processing on the second storage device, and notifies the storage apparatus, when a number of times of Read processing on the second storage device within a predetermined time period is larger than a predetermined threshold, of a request for allocating a first portion of the variable area to the main area on basis of the management information.

14 Claims, 13 Drawing Sheets

FIG.5

| LBA ADDRESS | CUMULATIVE NUMBER OF TIMES OF WRITE PROCESSING |
|---|---|
| 0x0000_0000 | 0x0000_0048 |
| 0x2000_0000 | 0x0000_0028 |
| ... | ... |

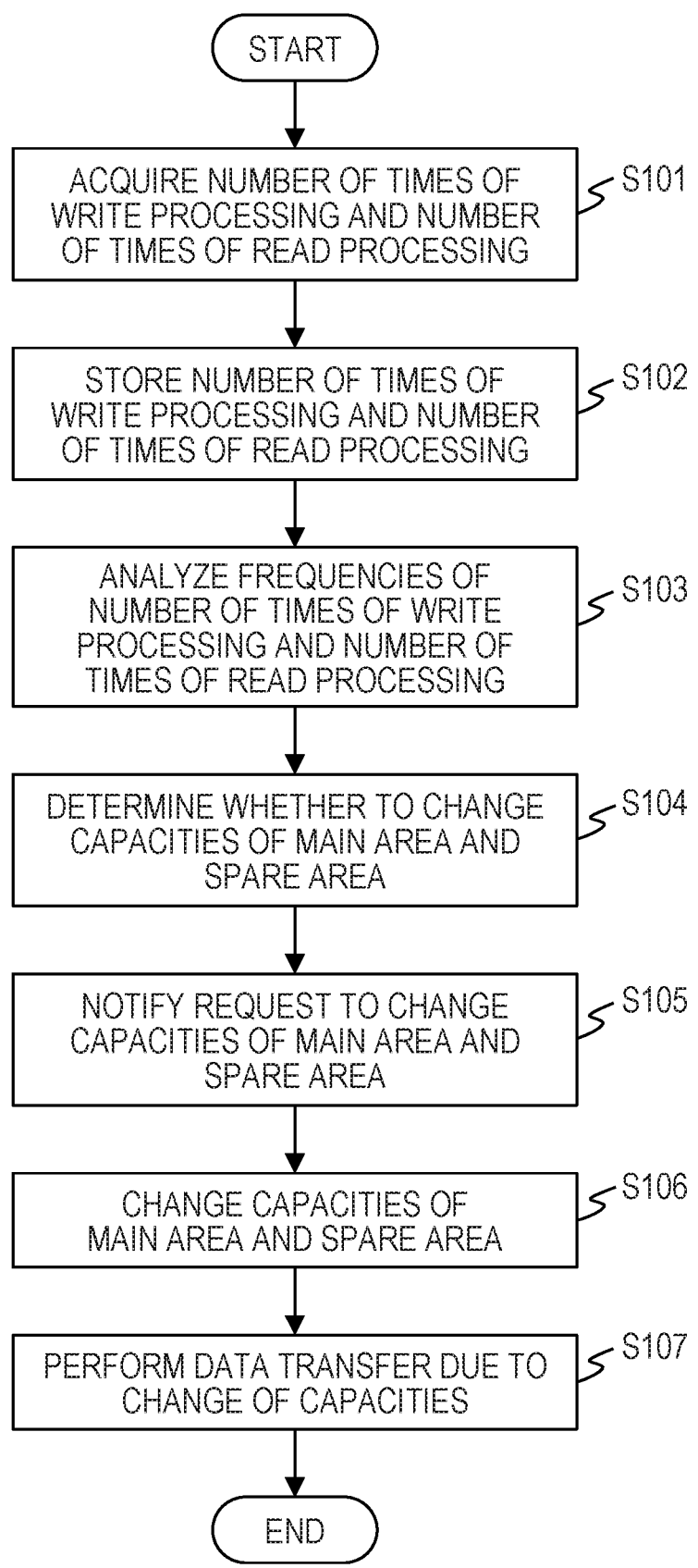

STORAGE CONTROL DEVICE AND STORAGE SYSTEM

CROSS-REFERENCE TO RELATED APPLICATION

This application is based upon and claims the benefit of priority from the prior Japanese Patent Application No. 2015-043332 filed on Mar. 5, 2015, the entire contents of which are incorporated herein by reference.

FIELD

The embodiment discussed herein is related to a storage control device and a storage system.

BACKGROUND

In a storage apparatus, a solid-state drive (SSD) or a hard disk drive (HDD) is mounted as a storage device. The HDD is a storage device which reads information stored in a disk coated with a magnetic material, by rotating the disk at a high speed and moving a magnetic head. The SSD is a storage device that uses a NAND-type flash memory as a storage medium.

A storage device using a NAND-type flash memory, such as an SSD, includes a plurality of memory blocks. The plurality of blocks are divided into a main area used for Write to the blocks and Read from the blocks, and a spare area used as a reserve area of the main area. In the SSD, a failure of a block unit occurs due to aging or the like. A failure caused by deterioration is previously assumed. Therefore, a medium such as an SSD has a spare area including spare blocks. By executing firmware, a processor of the storage apparatus regards a block in which a failure has occurred as a failure block, and replaces the failure block with a spare block within a spare area. The SSD maintains an initial capacity of a medium by replacing the capacity of the failure block with the spare block.

In terms of performance and life, a spare area of an SSD is used for background processing such as wear leveling, garbage collection, or the like. When there is a block with a high usage frequency within the SSD, the block with the high usage frequency (writing frequency) quickly reaches the end of life. A wear leveling technology is a technology in which a block with a low usage frequency is used to replace a block with a high usage frequency so as to achieve a levelling of usage frequencies of respective blocks.

Data in an SSD is written in the SSD by a unit called a page. However, deletion of data is performed by a unit of a block composed of a plurality of pages. A garbage collection technology is a technology in which when data on a page within a block is no longer needed, other data within the corresponding block, which is still needed, is transferred (written) to another block.

A method of extending a life of each of storage tiers within an automated storage tiering (AST) environment has been known. According to this method, a storage control device allocates a storage tier corresponding to a policy specified for an attribute or a volume of data in order to prolong a life of each of the storage tiers.

There is known a storage system in which the life of a flash memory is considered. The storage system stores and manages management information of an online flash memory. In a case where a portion or whole online flash memory is placed in an offline state, existing data stored in an area serving as a management area at the time of offline in the flash memory is moved to an area other than the management area, and the management area is created accordingly. Management information of the flash memory is then written in the created management area, and the flash memory is placed in an offline state.

Related techniques are disclosed in, for example, Japanese Laid-Open Patent Publication No. 2007-115232 and Japanese Laid-Open Patent Publication No. 2008-192061.

Background processing such as wear leveling, garbage collection, or the like is carried out during a process of writing to the SSD. On the other hand, the background processing is not carried out during a process of reading from the SSD. Therefore, an SSD to which a Read access is frequently made is placed in a state where the SSD keeps an unnecessary spare area that is not used, since the background processing is not carried out.

SUMMARY

According to an aspect of the present invention, provided is a storage control device including a first storage device and a processor. The first storage device is configured to store therein management information used for managing a variable area of storage regions provided to a second storage device included in a storage apparatus. Each of the storage regions is allocated to either one of a main area and a spare area. The variable area includes storage regions allocated to the spare area and allocatable to the main area. The main area is used for storing data. The spare area serves as a reserve area of the main area. The processor is configured to acquire, from the storage apparatus, information on numbers of times of Read processing on the second storage device and numbers of times of Write processing on the second storage device. The processor is configured to notify the storage apparatus, when a number of times of Read processing on the second storage device within a predetermined time period is larger than a first predetermined threshold, of a request for allocating a first portion of the variable area to the main area on basis of the management information.

The object and advantages of the invention will be realized and attained by means of the elements and combinations particularly pointed out in the claims. It is to be understood that both the foregoing general description and the following detailed description are exemplary and explanatory and are not restirctive of the invention, as claimed.

BRIEF DESCRIPTION OF DRAWINGS

FIG. 5 is a diagram illustrating an example of management information;

FIG. 6 is a flowchart illustrating an example of processing performed by a storage apparatus and a storage control device;

DESCRIPTION OF EMBODIMENT

Hereinafter, an embodiment will be described in detail with reference to the drawings. FIGS. 1A to 1D are diagrams illustrating examples of a storage apparatus and a storage control device according to the embodiment. A storage apparatus 100 includes a processor 160 for executing a program (firmware) and an SSD 110. In a case of the storage apparatus 100 in which the AST is implemented, the SSD 110 is a storage device arranged at, for example, "Tier0" which is the top tier. The storage apparatus 100 employs a technology of a redundant array of inexpensive disks (RAID) in which a plurality of SSDs (storage devices) are combined with each other to serve as a virtual single SSD 110.

Figure 1A:
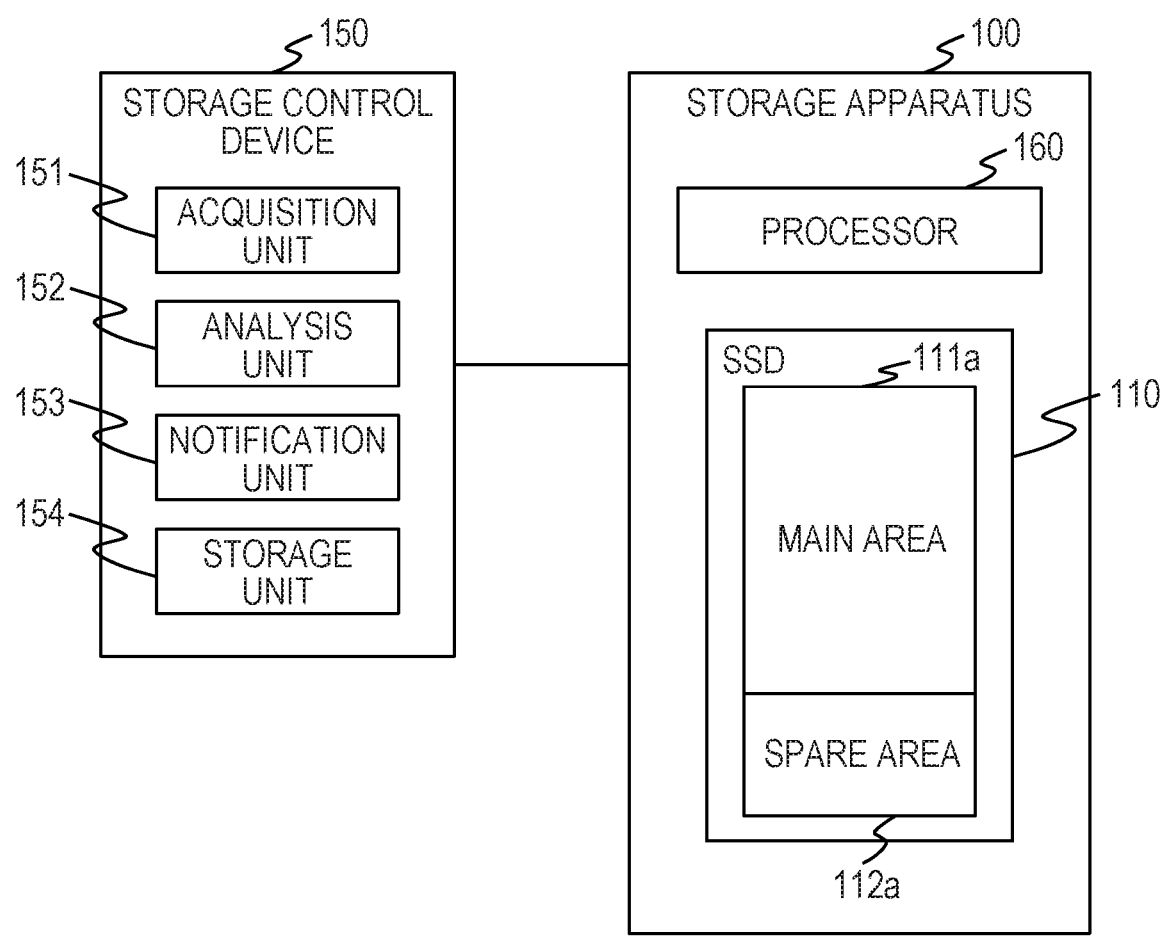
FIG. 1A is a diagram illustrating an example of a storage apparatus and an example of a storage control device according to an embodiment.

An SSD 110 illustrated in FIG. 1A is an example of an initial state of the SSD 110 according to the embodiment. The SSD 110 includes a main area 111a configured to store therein data, and a spare area 112a which is a reserve area of the main area 111a. The processor 160 is capable of changing capacities of the main area 111a and the spare area 112a. The processor 160 may acquire, from the SSD 110, the number of times of Write processing and the number of times of Read processing performed on the SSD 110.

A storage control device 150 includes an acquisition unit 151, an analysis unit 152, a notification unit 153, and a storage unit 154. The acquisition unit 151 acquires, from the processor 160, the number of times of Write processing and the number of times of Read processing performed on the SSD 110, which are acquired by the processor 160. The acquisition unit 151 acquires, from the storage apparatus 100, periodically information on the number of times of Write processing and the number of times of Read processing performed on the SSD 110. The analysis unit 152 analyzes the information on the number of times of Write processing and the number of times of Read processing performed on the SSD 110, which are acquired by the acquisition unit 151. More specifically, the analysis unit 152 calculates the number of times of Write processing and the number of times of Read processing performed on the SSD 110, every predetermined time period. For example, the analysis unit 152 calculates the number of times of Write processing and the number of times of Read processing performed on the SSD 110, every five minutes. The analysis unit 152 calculates the cumulative number of times of Write processing and the cumulative number of times of Read processing performed on the SSD 110 since initiation of analysis on the SSD 110, and stores the calculated numbers in the storage unit 154 within the storage control device 150. The notification unit 153, on the basis of an analysis result of the analysis unit 152, notifies the storage apparatus 100 of an instruction that requests a change of capacities of the main area and the spare area of the SSD 110.

Figure 1B:
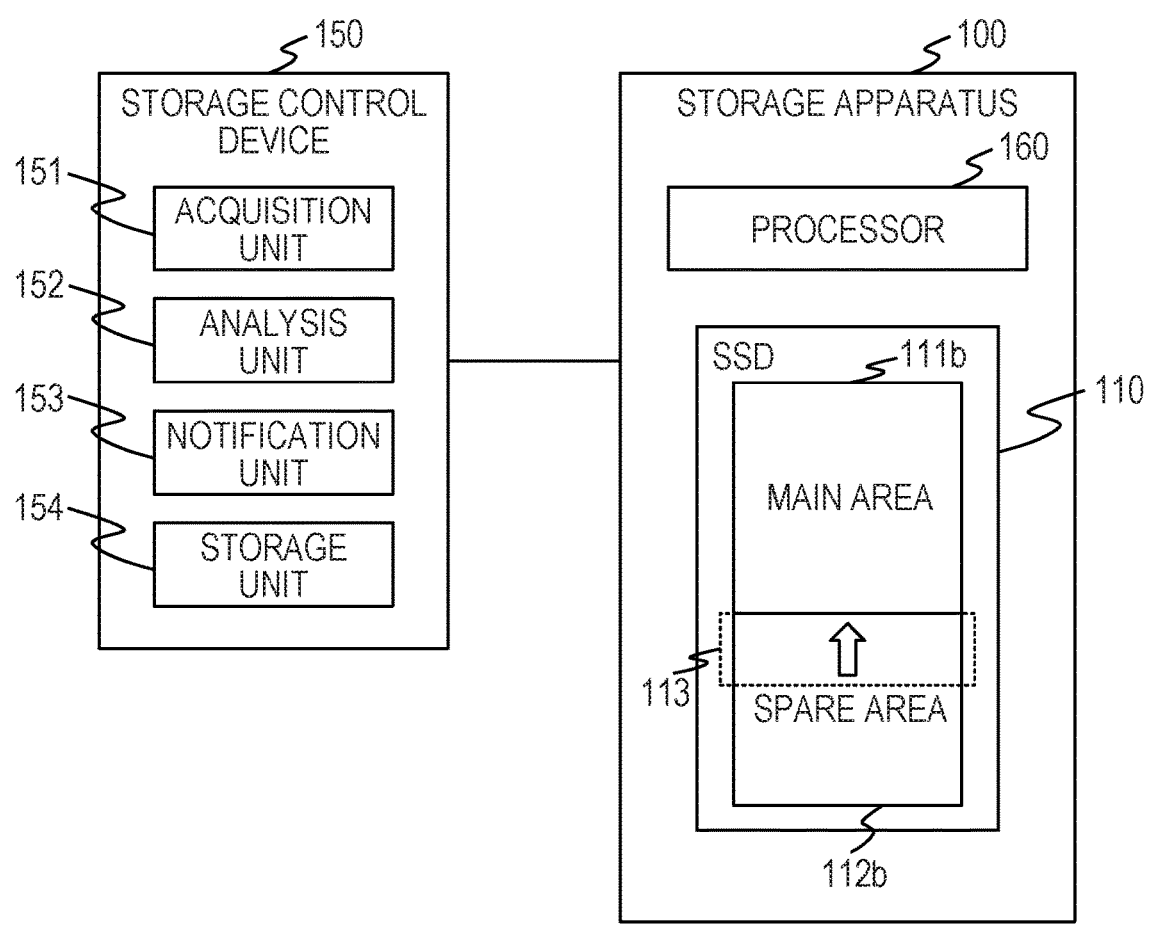
FIG. 1B is a diagram illustrating an example of a storage apparatus and an example of a storage control device according to an embodiment.

An SSD 110 illustrated in FIG. 1B is an example of a storage device in which the number of times of Write processing is large. Whenever the cumulative number of times of Write processing on the SSD 110 since the initiation of analysis increases by a predetermined number, the analysis unit 152 determines whether there is, among the plurality of SSDs (storage devices) constituting the RAID, an SSD on which the cumulative number of times of Write processing exceeds a predetermined threshold (hereinafter, referred to as a cumulative Write threshold). Hereinafter, the processing of determining whether there is, among the plurality of SSDs (storage devices) constituting the RAID, an SSD on which the cumulative number of times of Write processing exceeds the cumulative Write threshold will be referred to as "determination A1".

The analysis unit 152 determines whether the cumulative number of times of Write processing on every SSD (storage device) constituting the RAID exceeds the cumulative Write threshold. Hereinafter, the processing of determining whether the cumulative number of times of Write processing on every SSD (storage device) constituting the RAID exceeds the cumulative Write threshold will be referred to as "determination A2." When it is determined that the cumulative number of times of Write processing on every SSD (storage device) constituting the RAID exceeds the cumulative Write threshold, the storage control device 150 notifies a user that the life of the SSD 110 has almost reached the end. Hereinafter, the processing of notifying a user that the life of the SSD 110 has almost reached the end performed by the storage control device 150 will be referred to as "processing A2."

In terms of performance and life, in the SSD 110, in which the number of times of Write processing is large, background processing such as wear leveling or garbage collection is performed. A target of the background processing is the spare area. In the SSD 110, as the number of times of Write processing is increased, the number of times of execution of wear leveling is increased in order to suppress deterioration of the storage medium. When the capacity of a spare area 112b of the SSD 110 is small, empty blocks within the spare area 112b which are to replace deteriorated blocks due to wear leveling are insufficient. This leads to a high possibility that a deteriorated block that is not able to be replaced by a block of the spare area 112b due to wear leveling may occur, and thus the life of the SSD 110 becomes short.

When there is an SSD (storage device), within the RAID, on which the cumulative number of times of Write processing exceeds the cumulative Write threshold, the notification unit 153 notifies the storage apparatus 100 of an instruction that requests an allocation of a portion of a main area 111b to the spare area 112b. Hereinafter, the processing of notifying the storage apparatus 100 of the instruction that requests an allocation of a portion of the main area 111b to the spare area 112b performed by the notification unit 153 when there is an SSD (storage device), within the RAID, on which the cumulative number of times of Write processing exceeds the cumulative Write threshold will be referred to as "processing A1."

Here, the portion of the main area 111b is referred to as a variable area 113. The variable area 113 is an area that may be set to either one of a main area 111 and a spare area 112 by the processor 160. The storage unit 154 stores therein management information used for managing area information of the variable area 113.

The processor 160 sets the variable area 113 to be available as the spare area 112b in accordance with the instruction from the notification unit 153. As a result, as in the SSD 110 illustrated in FIG. 1B, the variable area 113 is incorporated in the spare area 112b. The processor 160 may implement the setting of the variable area 113 as the spare area 112b by issuing, for example, an "Unmap command" among small computer system interface (SCSI) commands for a logical address of a block of the main area 111b. When data is stored in a block for which the Unmap command has been executed, the data may be copied to an SSD at a lower tier (for example, Tier1).

As in the SSD 110 of FIG. 1B, since the capacity of the spare area 112b is increased, blocks that may replace deteriorated blocks due to wear leveling are increased as compared to that in the SSD 110 of FIG. 1A. Therefore, the life of the SSD 110 of FIG. 1B, as the storage device, may be prolonged.

Figure 1C:
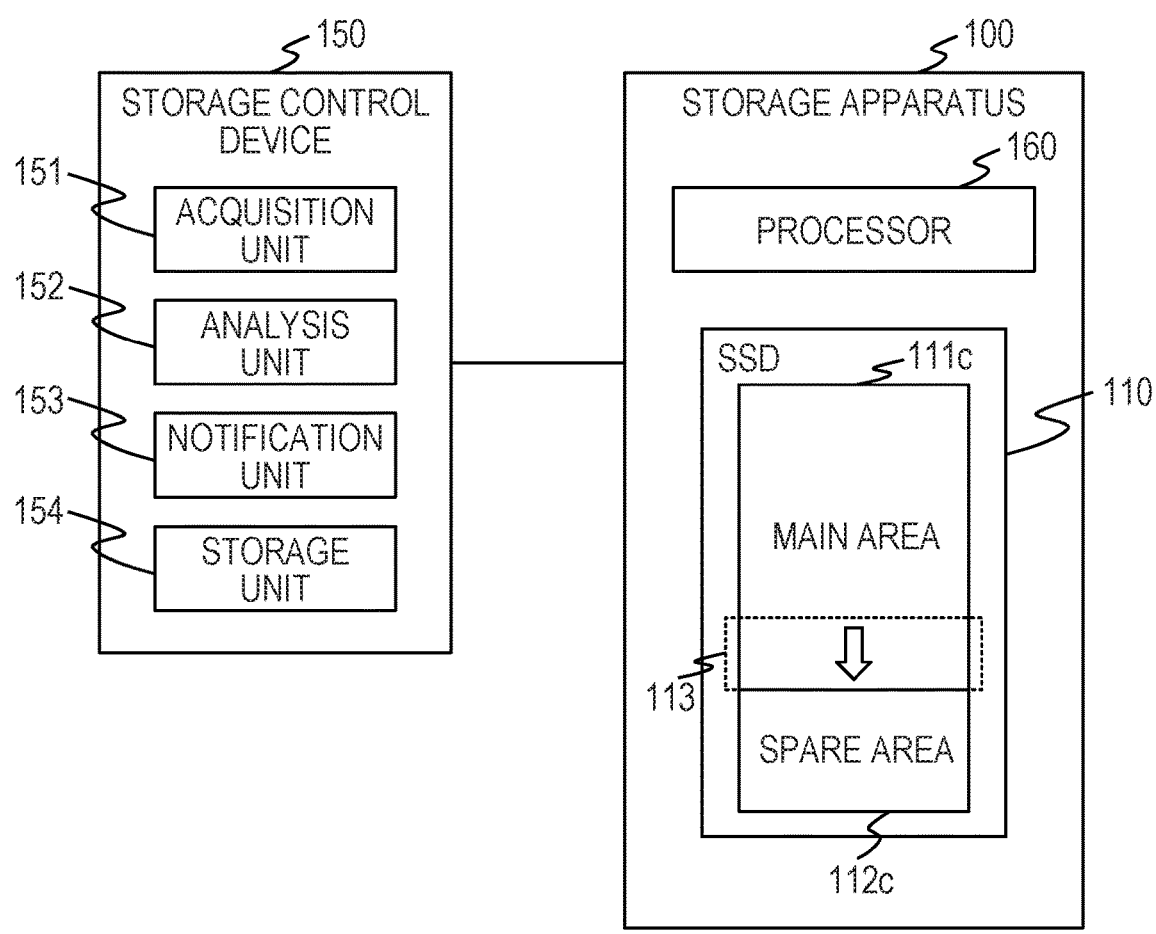
FIG. 1C is a diagram illustrating an example of a storage apparatus and an example of a storage control device according to an embodiment.

An SSD 110 illustrated in FIG. 1C is an example of a storage device in which the number of times of Read processing is large. It is assumed that the storage unit 154 of FIG. 1C stores therein management information indicating that a portion of a main area 111c is used as a spare area 112c. That is, it is assumed that a portion of the main area 111c within the SSD 110 of FIG. 1C is used as a spare area. The portion of the main area 111c, which is used as a spare area, within the SSD 110 of FIG. 1C is a variable area 113.

Background processing is carried out when a writing operation is performed on the SSD 110. On the other hand, the background processing is not carried out when a reading operation is performed on the SSD 110. Then, the SSD 110 in which the number of times of Read processing is large is placed in a state where the SSD 110 keeps an unnecessary spare area 112c that is not used.

The analysis unit 152 determines whether the number of times of Read processing performed on an SSD 110 within a predetermined time period (for example, 5 minutes) exceeds a predetermined threshold (hereinafter, referred to as a Read threshold), on the basis of information acquired by the acquisition unit 151. Hereinafter, the processing of determining whether the number of times of Read processing performed on the SSD 110 within the predetermined time period exceeds the Read threshold will be referred to as "determination B." When the number of times of Read processing performed on the SSD 110 within the predetermined time period exceeds the Read threshold, the notification unit 153 notifies the storage apparatus 100 of an instruction that requests an allocation of the variable area 113 to the main area 111c on the basis of management information. Hereinafter, the processing of notifying the storage apparatus 100 of an instruction that requests an allocation of the variable area 113 to the main area 111c will be referred to as "processing B." Information on the variable area 113 allocated to the main area 111c within the management information is deleted from the storage unit 154.

The processor 160 sets the variable area 113 as the main area 111c in accordance with the instruction from the notification unit 153. As a result, as in the SSD 110 illustrated in FIG. 1C, the variable area 113 is incorporated in the main area 111c. To set the variable area 113 as the main area 111c, the processor 160 may implement the setting by issuing, for example, a "Write command" on a memory area (block) of the variable area 113.

As in the SSD 110 illustrated in FIG. 1C, when the capacity of the spare area 112c is reduced, the unnecessary spare area 112c that is not used in the background processing may be reduced. Since the main area 111c used for Read processing is increased, data amount stored in the Tier0 is increased and a hit rate of Read processing is improved. This enables high speed Read processing for the SSD 110.

Figure 1D:
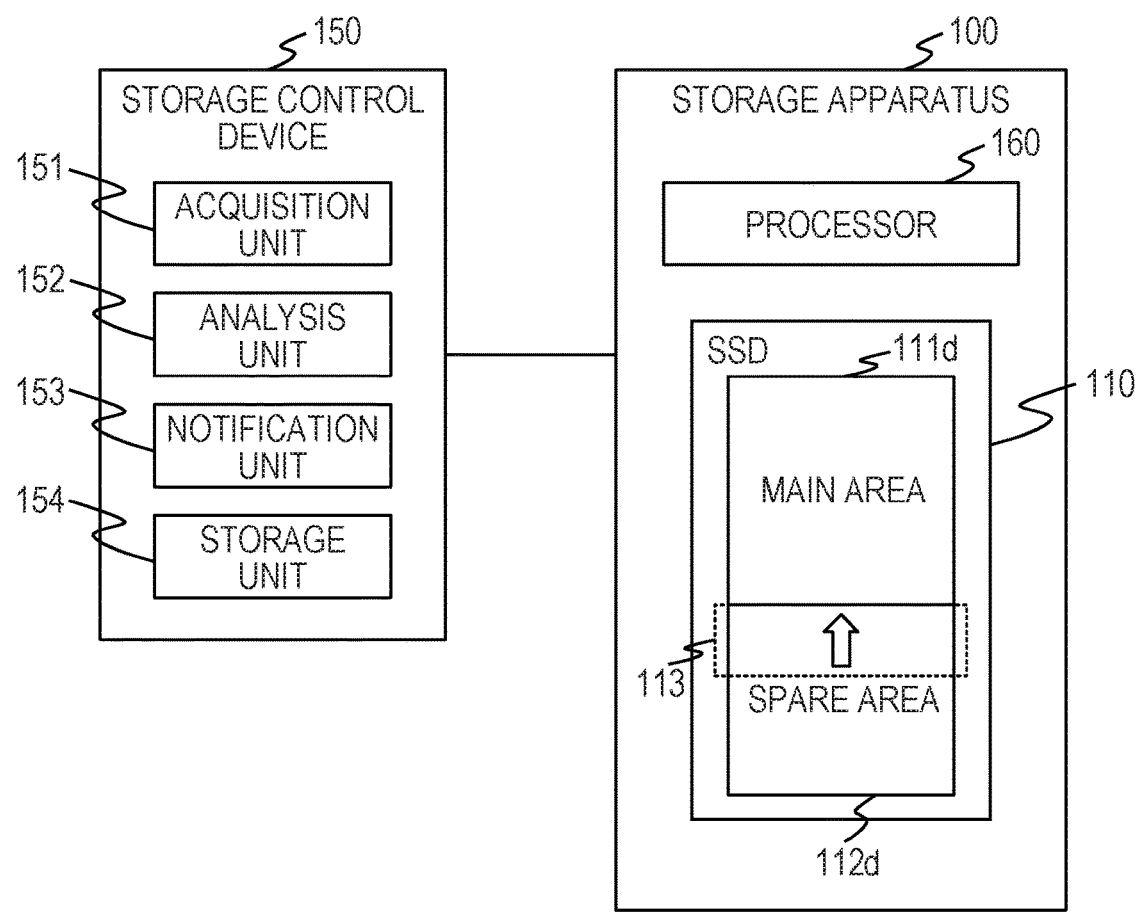
FIG. 1D is a diagram illustrating an example of a storage apparatus and an example of a storage control device according to an embodiment.

An SSD 110 illustrated in FIG. 1D is an example of a storage device in which the number of times of Write processing is large. The analysis unit 152 determines whether the number of times of Write processing performed on the SSD 110 within a predetermined time period (for example, 5 minutes) exceeds a predetermined threshold (hereinafter, referred to as a Write threshold). Hereinafter, the processing of determining whether the number of times of Write processing performed on the SSD 110 within the predetermined time period exceeds the Write threshold will be referred to as "determination C."

When Write processing is increased, the number of times of execution of garbage collection as background processing is also increased. In the garbage collection, when unnecessary data is deleted, necessary data present in the same block as that of the corresponding unnecessary data is transferred to a block within a spare area 112d. Therefore, when the number of times of execution of garbage collection is increased, blocks as the transfer destination in the spare area 112d may be insufficient. When the number of times of garbage collection is increased, a writing (transferring) process needs a time, thereby lowering the performance of the SSD 110.

When the number of times of Write processing within a predetermined time period exceeds the Write threshold, the notification unit 153 notifies the storage apparatus 100 of an instruction that requests an allocation of a portion of a main area 111d to the spare area 112d. Hereinafter, the processing of notifying the storage apparatus 100 of the instruction that requests an allocation of a portion of the main area 111d to the spare area 112d performed by the notification unit 153 when the number of times of Write processing within the predetermined time period exceeds the Write threshold will be referred to as "processing C." The storage unit 154 stores therein management information used for managing information of the portion of the main area 111d, which is the variable area 113 requested to be allocated to the spare area 112d.

The processor 160 sets the variable area 113 to be available as the spare area 112d in accordance with the instruction from the notification unit 153. As a result, as in the SSD 110 illustrated in FIG. 1D, the variable area 113 is incorporated in the spare area 112d. The processor 160 may implement the setting of the variable area 113 as the spare area 112d by issuing, for example, an "Unmap command" among SCSI commands for a logical address of a block of the main area 111d. When data is stored in a block for which the Unmap command has been executed, the data may be copied to an SSD at a lower tier (for example, Tier1).

As in the SSD 110 of FIG. 1D, when the capacity of the spare area 112d is increased, blocks that may be used in garbage collection are increased. Since transfer destination blocks may be easily secured, capacity securing processing for performing garbage collection is eliminated. Since the capacity of the spare area 112d is increased, even in the SSD 110 in which the number of times of Write processing is large, the performance of Write processing of the SSD 110 may be maintained.

As in the SSD 110 of FIG. 1B, when there is an SSD on which the cumulative number of times of Write processing exceeds the cumulative Write threshold, the variable area 113 is set as the spare area 112b. When the capacity of the spare area 112b is increased, blocks which may replace deteriorated blocks due to wear leveling are increased. Then, the life of the SSD 110 of FIG. 1B, serving as the storage device, may be prolonged.

In the SSD 110 of FIG. 1C in which the number of times of Read processing within a predetermined time period exceeds the Read threshold, the capacity of the spare area 112c is decreased. When the capacity of the spare area 112c is decreased, the unnecessary spare area 112c that is not used in the background processing may be reduced. Since the main area 111c used for Read processing is increased, data amount stored in the Tier0 is increased and the hit rate of the Read processing is improved. This enables high speed Read processing for the SSD 110.

In the SSD 110 of FIG. 1D in which the number of times of Write processing within a predetermined time period exceeds the Write threshold, the capacity of the spare area 112d is increased. When the capacity of the spare area 112d is increased, blocks usable in garbage collection are increased. Since transfer destination blocks may be easily secured, capacity securing processing for performing garbage collection is eliminated. When the capacity of the spare area 112d is increased, even in the SSD 110 in which the number of times of Write processing is large, the performance of Write processing of the SSD 110 may be maintained.

An SSD 110 in which the variable area 113 may be set as a main area or a spare area is not limited to an SSD arranged at the top tier in the AST as in the SSD 110 of FIGS. 1A to 1D. An SSD 110 in which the variable area 113 may be set as a main area or a spare area may be implemented at all tiers. The processing described for the SSD 110 in FIGS. 1A to 1D may be performed on an SSD mounted in a storage apparatus 100 in which the AST is not implemented. The storage control device 150 may perform, on an HDD, similar processing to those of determinations A1 to C and processing A1 to C performed on the SSD 110.

Figure 2:
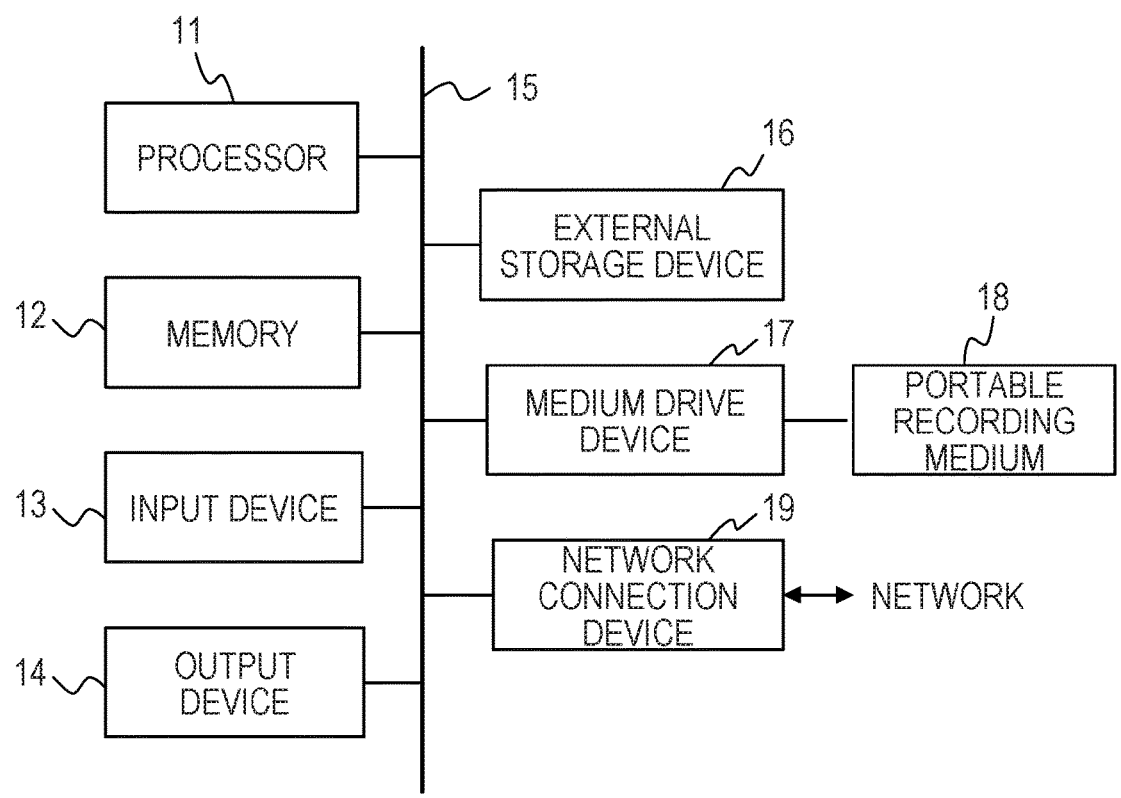
FIG. 2 is a diagram illustrating an exemplary hardware configuration of a storage control device.

FIG. 2 is a diagram illustrating an exemplary hardware configuration of a storage control device. The storage control device 150 includes a processor 11, a memory 12, a bus 15, an external storage device 16, and a network connection device 19. The storage control device 150 may include an input device 13, an output device 14, and a medium drive device 17. The storage control device 150 is, for example, a computer.

The processor 11 may be any of processing circuits, and may be, for example, a central processing unit (CPU). The processor 11 operates as the acquisition unit 151, the analysis unit 152, and the notification unit 153 in the storage control device 150. The processor 11, for example, may execute a program stored in the external storage device 16.

The memory 12 stores therein data acquired by the acquisition unit 151 and data used by the analysis unit 152. The memory 12 operates as the storage unit 154. In some cases, the external storage device 16 may be used instead of the memory 12. The memory 12 also stores therein data obtained through operations of the processor 11, or data used for processing performed by the processor 11.

The network connection device 19 is used for communication with another device such as, for example, the storage apparatus 100. The network connection device 19 is, for example, a network interface circuit such as a network adaptor. The storage control device 150 acquires information such as the number of times of Write processing or the number of times of Read processing of the SSD 110, from the storage apparatus 100 via the network connection device 19 and a network. The network connection device 19 is an interface operates as a transmission/reception device used for acquisition of data by the acquisition unit 151 and transmission of data by the notification unit 153.

The input device 13 may be, for example, a button, a keyboard, a mouse, or the like. The output device 14 may be a display device or the like. The bus 15 interconnects the processor 11, the memory 12, the input device 13, the output device 14, the external storage device 16, the medium drive device 17, and the network connection device 19 so that data may be exchanged. Programs, data, and the like are stored in the external storage device 16. The external storage device 16 may be, for example, an HDD or an SSD. Information stored in the external storage device 16 is provided to the processor 11 or the like. The medium drive device 17 may output data stored in the memory 12 or the external storage device 16 to a portable recording medium 18, and may read a program, data, or the like from the portable recording medium 18. Here, the portable recording medium 18 may be any portable storage medium such as a flexible disk, a magneto-optical (MO) disk, a compact disc recordable (CD-R), a digital versatile disc recordable (DVD-R), or the like. The portable recording medium 18 may be a semiconductor memory card such as a flash memory, and the medium drive device 17 may be a reader/writer for a memory card.

The memory 12, the external storage device 16, and the portable recording medium 18 are examples of a tangible storage medium. This type of storage medium is not a transitory medium such as a signal carrier wave.

Figure 3:
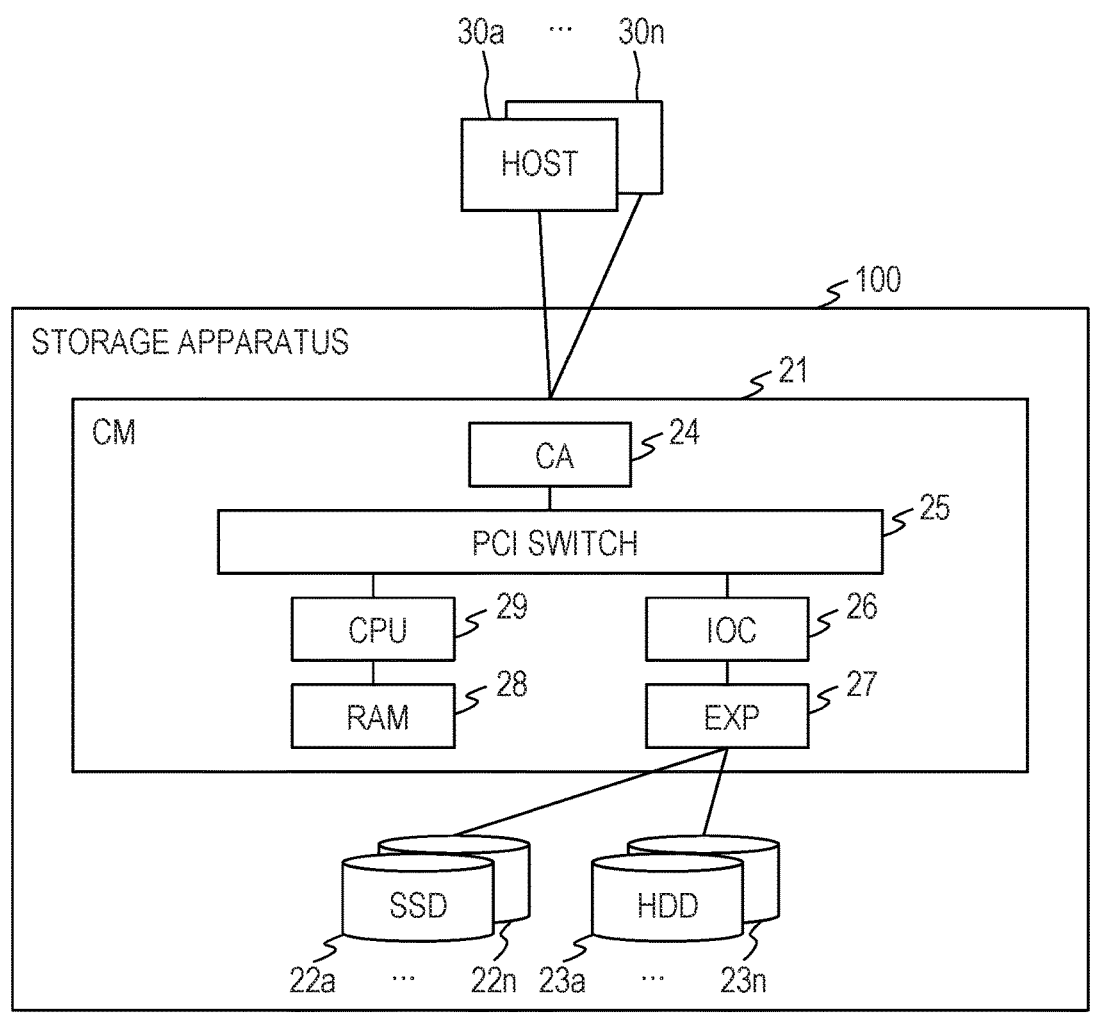
FIG. 3 is a diagram illustrating an exemplary hardware configuration of a storage apparatus.

FIG. 3 is a diagram illustrating an exemplary hardware configuration of a storage apparatus. The storage apparatus 100 includes a controller module (CM) 21, a plurality of SSDs 22 (22a to 22n) and a plurality of HDDs 23 (23a to 23n). The SSDs 22a to 22n or the HDDs 23a to 23n are not intended to limit the number of SSDs, HDDs, or the like. The plurality of SSDs 22 constitute a RAID, and thus are virtually used as the SSD 110.

The CM 21 includes a channel adapter (CA) 24, a peripheral component interconnect (PCI) switch 25, an input/output controller (IOC) 26, an expander (EXP) 27, a random access memory (RAM) 28, and a CPU 29. The CM 21 is connected to hosts 30 (30a to 30n) indicating a host computer such as a server. The CM 21 receives write data transmitted from the host 30 and performs a writing operation on the SSD 22 or the HDD 23. The CM 21 reads data from the SSD 22 or the HDD 23 in accordance with a data read request from the host 30.

The CA 24 is an interface with the host 30. For example, the CA 24 is connected to the host 30 using an interface such as a fiber channel (FC) or an Internet SCSI (iSCSI). The PCI switch 25 is a switch compliant with an input/output interface of PCI Express (PCIe) specification. The PCI switch 25 is connected to the CA 24, the CPU 29, and the IOC 26 using the PCIe interface.

The IOC 26 controls input and output of data which are performed between the host 30 and the SSD 22, and between the host 30 and the HDD 23. For example, the IOC 26 receives write data using the PCIe interface, and transmits the data to the EXP 27 using a serial attached SCSI (SAS) interface. That is, the IOC 26 serves a role as a bridge for the PCIe interface and the SAS interface. The EXP 27 relays input and output of data which is performed between the host 30 and the SSD 22, and between the host 30 and the HDD 23.

The RAM 28 is used as a cache area. The cache area is an area that temporarily holds contents of data. The CPU 29 includes an internal memory that stores therein a program in which various processing sequences are defined, or control data, and performs various processing using the program and data. The processing of the processor 160 in FIGS. 1A to 1D are also performed by the CPU 29.

Figure 4:
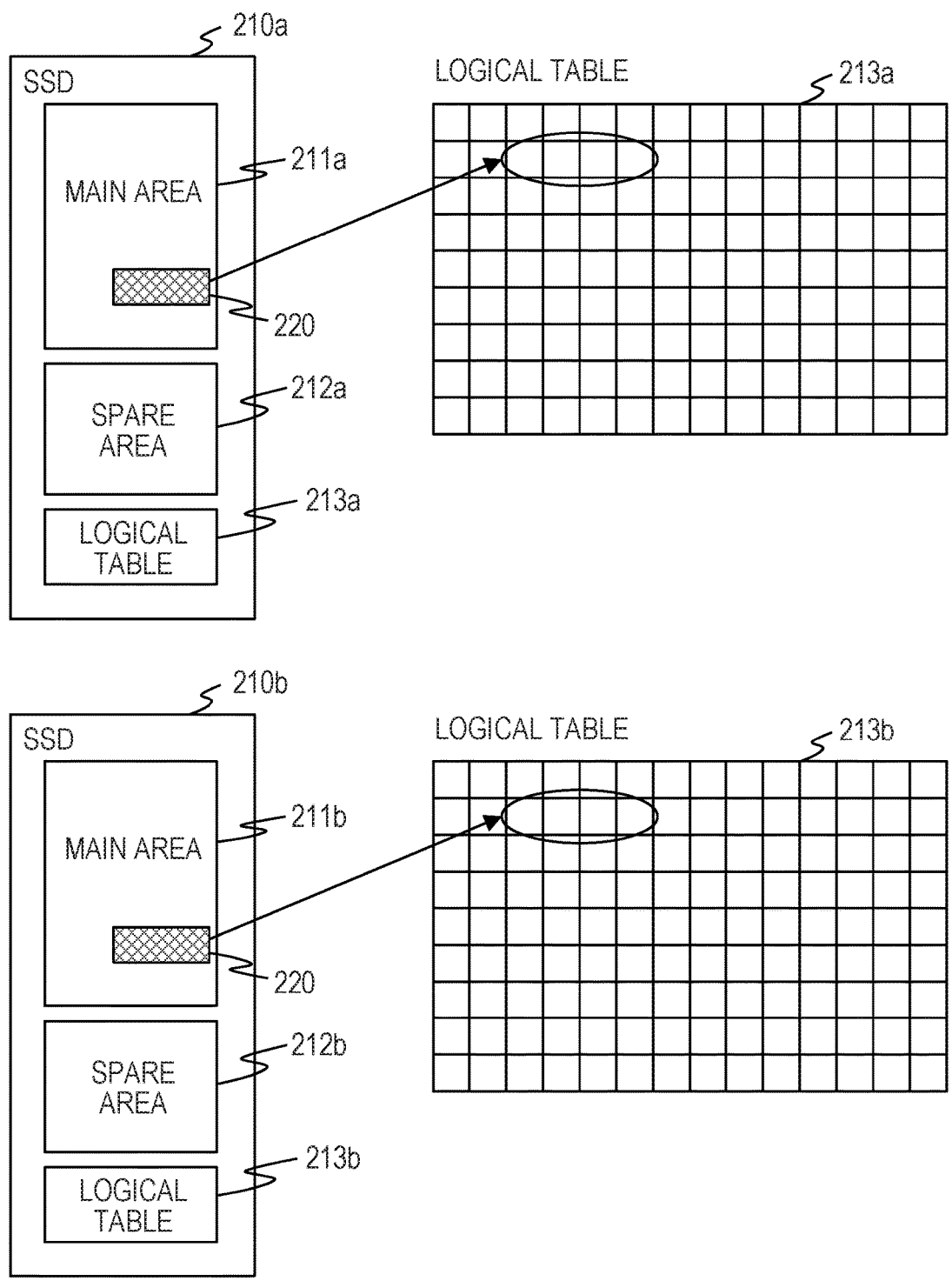
FIG. 4 is a diagram illustrating an example of an Unmap command and an example of a Write command.

FIG. 4 is a diagram illustrating an example of an Unmap command and a Write command. An SSD 210a in FIG. 4 includes a main area 211a, a spare area 212a, and a table area that stores therein a logical table 213a. The main area 211a actually stores therein data, and is provided as a storage area to a user. The spare area 212a is a reserve area of the main area 211a. The logical table 213a is information for managing an address of a physical block of an SSD together with a logical block address (LBA) which is a logical address associated with the address of the corresponding physical block in order to virtually use the corresponding physical block. Each square of the logical table 213a indicates one page unit.

As in the SSD 110 of FIG. 1B or FIG. 1D, the processor 160 executes an Unmap command on an LBA indicating a predetermined physical block within the main area 211a. The Unmap command is executed by a block unit. In the example of FIG. 4, one block includes four pages. A physical block 220 subject to the Unmap command is not used as the main area 211a, and thus is recognized as the spare area 212a. That is, the physical block 220 subject to the Unmap command is a variable area. When the storage control device 150 requests the storage apparatus 100 to execute the Unmap command, the address information of the LBA indicating the physical block 220 subject to the Unmap command is stored as management information in the storage unit 154.

An SSD 210b includes a main area 211b, a spare area 212b, and a logical table 213b. In the example of the SSD 210b, as in the SSD 110 of FIG. 1C, the processing B is performed. That is, the notification unit 153 of the storage control device 150 notifies the storage apparatus 100 of an instruction that requests an allocation of the physical block 220, which is subject to an Unmap command, to the main area 211b on the basis of the management information. The processor 160 executes a Write command on the physical block 220 subject to the Unmap command on the basis of the management information. A physical block 220 in which some data is written is used as the main area 211b. It may be also said that management information used in this case manages an area within the spare area, which is usable as the main area.

FIG. 5 is a diagram illustrating an example of management information. The storage unit 154 of the storage control device 150 stores therein management information of an SSD. The management information is information in which an LBA address indicating a block subject to an Unmap command is associated with a cumulative number of times of Write processing on the block indicated by the corresponding LBA address.

For example, the management information indicates that a block of LBA address 0x0000_0000 is a block subject to an Unmap command, and the cumulative number of times of Write processing on the corresponding block is 0x0000_0048. Likewise, the management information indicates that a block of LBA address 0x2000_0000 is a block subject to an Unmap command, and the cumulative number of times of Write processing on the corresponding block is 0x0000_0028. By returning blocks to the main area using a Write command in an ascending order of the cumulative numbers of times of Write processing for the LBA addresses indicating the blocks, levelling of usage frequencies of respective blocks may be achieved.

FIG. 6 is a flowchart illustrating an example of processing performed by a storage apparatus and a storage control device. The processor 160 of the storage apparatus 100 acquires, from the SSD 110, the number of times of Write processing and the number of times of Read processing (S101). The acquisition unit 151 of the storage control device 150 acquires information acquired by the processor 160, and stores the information in the storage unit 154 (S102). The analysis unit 152 of the storage control device 150 analyzes frequencies of the number of times of Write processing and the number of times of Read processing (S103). The analysis unit 152 determines whether to change capacities of the main area and the spare area, on the basis of the analysis result (S104). The notification unit 153 of the storage control device 150 notifies the storage apparatus 100 of a request for changing capacities of the main area and the spare area (S105).

The processor 160 of the storage apparatus 100 changes the capacities of the main area and the spare area in accordance with the request in S105 (S106). The processor 160 performs data transfer due to the change of the capacities of the main area and the spare area (S107).

FIGS. 7A to 7D are flowcharts illustrating an example of processing performed by a storage control device. S103 to S105 in FIG. 6 will be described in more detail with reference to the flowcharts of FIGS. 7A to 7D. The processing of the flowcharts illustrated in FIGS. 7A to 7D is performed on all SSDs included in the RAID.

Figure 7A:
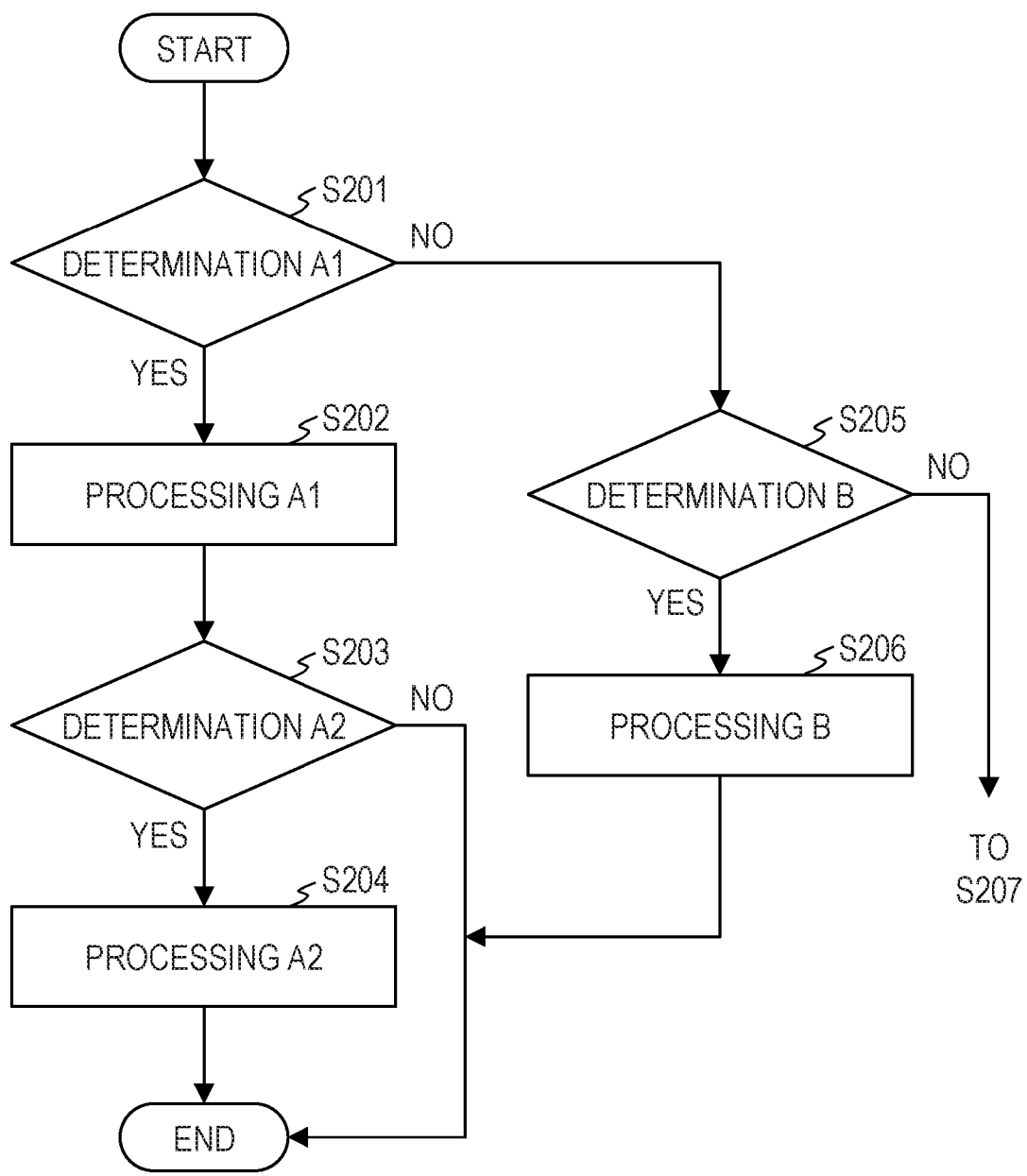
FIG. 7A is a flowchart illustrating an example of processing performed by a storage control device.
Figure 7B:
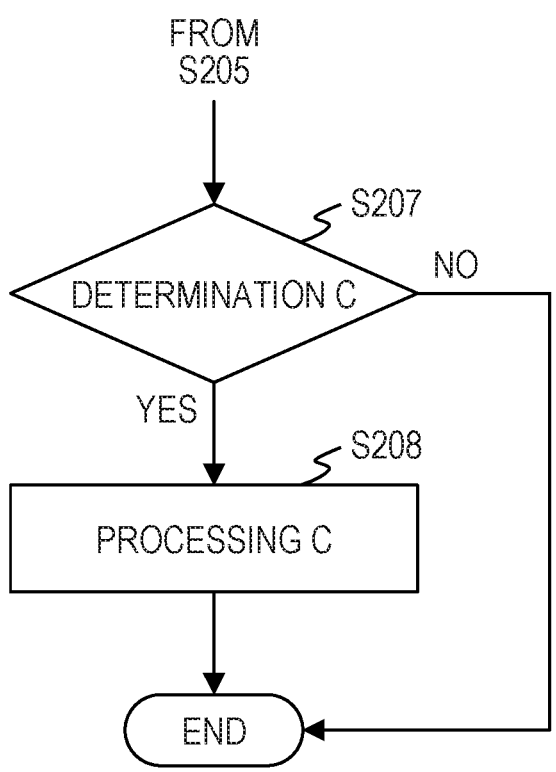
FIG. 7B is a flowchart illustrating an example of processing performed by a storage control device.

First, when the storage control device 150 initiates an analysis of the storage apparatus 100, the processing of the storage control device 150 illustrated in FIGS. 7A to 7B is performed. The analysis unit 152 determines whether the cumulative number of times of Write processing on an SSD exceeds the cumulative Write threshold since initiation of the analysis (S201). The processing of S201 is "determination A1" described with reference to FIG. 1B. When it is determined that the cumulative number of times of Write processing on an SSD exceeds the cumulative Write threshold ("YES" in S201), the notification unit 153 notifies the storage apparatus 100 of an instruction that requests an allocation of the variable area 113 to the spare area 112 (S202). The processing of S202 is "processing A1" described with reference to FIG. 1B. The analysis unit 152 determines whether the cumulative number of times of Write processing on every SSD within the RAID exceeds the cumulative Write threshold (S203). The processing of S203 is "determination A2" described with reference to FIG. 1B. When it is determined that the cumulative number of times of Write processing on every SSD within the RAID exceeds the cumulative Write threshold ("YES" in S203), the notification unit 153 notifies a user that the life of the SSD 110 has almost reached the end (S204). The processing of S204 is "processing A2" described with reference to FIG. 1B. When it is determined that the cumulative number of times of Write processing on at least one SSD within the RAID does not exceed the cumulative Write threshold ("NO" in S203), the storage control device 150 terminates the control processing of the SSD 110. When the processing of S204 is completed, the storage control device 150 terminates the control processing of the SSD 110.

When it is determined that no cumulative number of times of Write processing on the respective SSDs exceeds the cumulative Write threshold ("NO" in S201), the analysis unit 152 determines whether the number of times of Read processing performed on the SSD 110 within a predetermined time period exceeds the Read threshold (S205). The processing of S205 is "determination B" described with reference to FIG. 1C. When it is determined that the number of times of Read processing performed on the SSD 110 within the predetermined time period exceeds the Read threshold ("YES" in S205), the notification unit 153 notifies the storage apparatus 100 of a request for executing an Unmap command to increase the capacity of the spare area (S206). The processing of S206 is "processing B" described with reference to FIG. 1C. When the processing of S206 is completed, the storage control device 150 terminates the control processing of the SSD 110.

When it is determined that the number of times of Read processing performed on the SSD 110 within the predetermined time period does not exceed the Read threshold ("NO" in S205), it is determined whether the number of times of Write processing performed on the SSD 110 within a predetermined time period exceeds the Write threshold (S207). The processing of S207 is "determination C" described with reference to FIG. 1D. When it is determined that the number of times of Write processing performed on the SSD 110 within the predetermined time period exceeds the Write threshold ("YES" in S207), the notification unit 153 notifies the storage apparatus 100 of a request for executing an Unmap command to increase the capacity of the spare area (S208). The processing of S208 is "processing C" described with reference to FIG. 1D. When it is determined that the number of times of Write processing performed on the SSD 110 within the predetermined time period does not exceed the Write threshold ("NO" in S207), the storage control device 150 terminates the control processing of the SSD 110. When the processing of S208 is completed, the storage control device 150 terminates the control processing of the SSD 110.

The SSD 110 on which processing A1 has been performed in S202, and determination of "NO" has been made in S203 is still subject to the processing of FIGS. 7A to 7B. When processing A2 has been performed in S204, the cumulative number of times of Write processing on the SSD 110 is too large. Thus, the processing illustrated in FIGS. 7A to 7B is not performed afterwards on the SSD 110. In other words, when processing A2 has been performed in S204, the life of the SSD 110 has almost reached the end. The SSD 110 on which processing C has been performed in S208 is subject to processing of FIG. 7D to be described below.

Figure 7C:
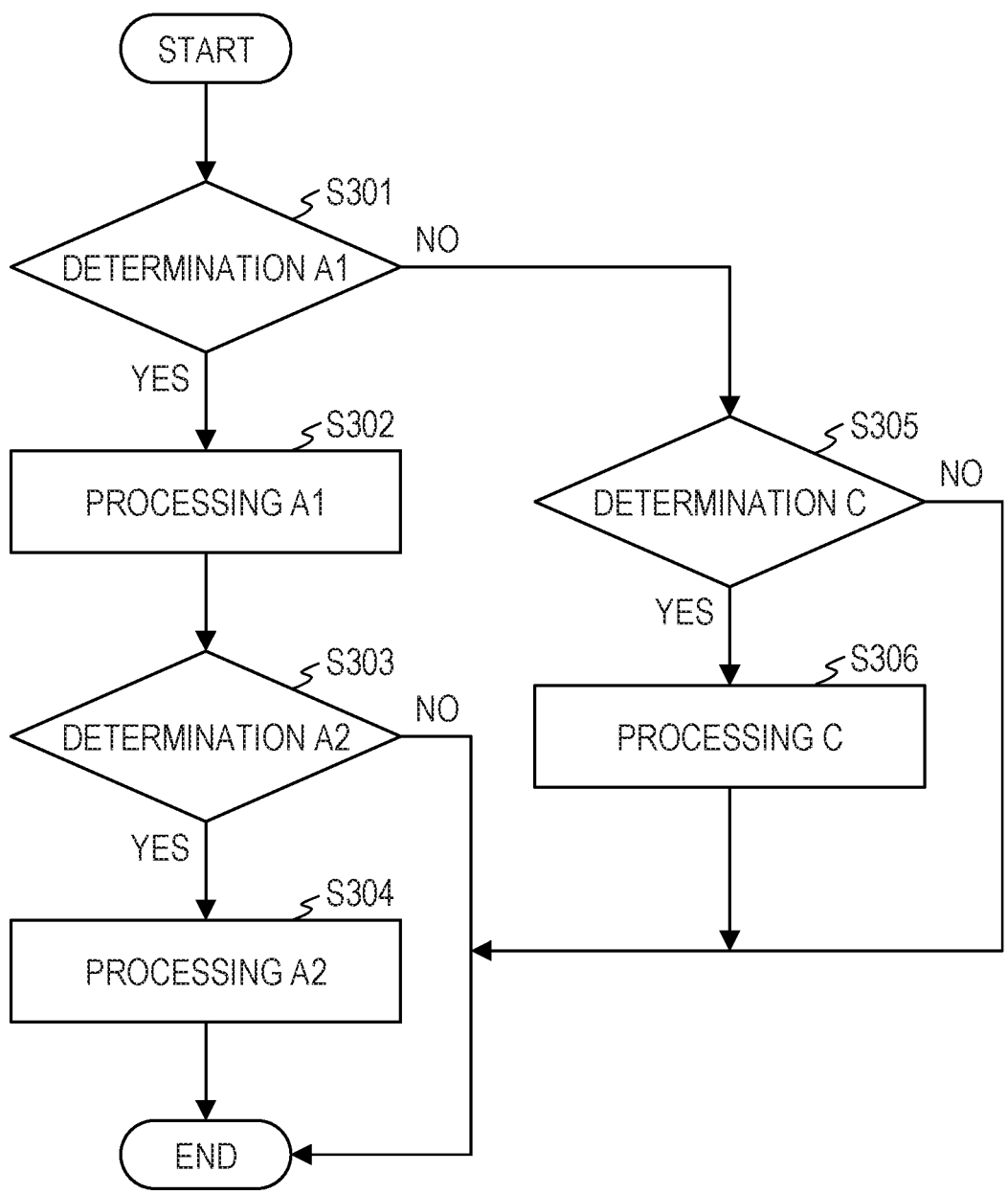
FIG. 7C is a flowchart illustrating an example of processing performed by a storage control device.

The SSD 110 on which processing B has been performed in S206 is subject to processing of FIG. 7C. The analysis unit 152 determines whether the cumulative number of times of Write processing on an SSD exceeds the cumulative Write threshold since initiation of the analysis (S301). The processing of S301 is "determination A1" described with reference to FIG. 1B. When it is determined that the cumulative number of times of Write processing on an SSD exceeds the cumulative Write threshold ("YES" in S301), the notification unit 153 notifies the storage apparatus 100 of an instruction that requests an allocation of a variable area 113 to the spare area 112 (S302). The processing of S302 is "processing A1" described with reference to FIG. 1B. The analysis unit 152 determines whether the cumulative number of times of Write processing on every SSD within the RAID exceeds the cumulative Write threshold (S303). The processing of S303 is "determination A2" described with reference to FIG. 1B. When it is determined that the cumulative number of times of Write processing on every SSD within the RAID exceeds the cumulative Write threshold ("YES" in S303), the notification unit 153 notifies the user that the life of the SSD 110 has almost reached the end (S304). The processing of S304 is "processing A2" described with reference to FIG. 1B. When it is determined that the cumulative number of times of Write processing on at least one SSD within the RAID does not exceed the cumulative Write threshold ("NO" in S303), the storage control device 150 terminates the control processing of the SSD 110. When the processing of S304 is completed, the storage control device 150 terminates the control processing of the SSD 110.

When it is determined that no cumulative number of times of Write processing on the respective SSDs exceeds the cumulative Write threshold ("NO" in S301), it is determined whether the number of times of Write processing performed on the SSD 110 within a predetermined time period exceeds the Write threshold (S305). The processing of S305 is "determination C" described with reference to FIG. 1D. When it is determined that the number of times of Write processing performed on the SSD 110 within the predetermined time period exceeds the Write threshold ("YES" in S305), the notification unit 153 notifies the storage apparatus 100 of a request for executing an Unmap command to increase the capacity of the spare area (S306). The processing of S306 is "processing C" described with reference to FIG. 1D. When it is determined that the number of times of Write processing performed on the SSD 110 within the predetermined time period does not exceed the Write threshold ("NO" in S305), the storage control device 150 terminates the control processing of the SSD 110. When the processing of S306 is completed, the storage control device 150 terminates the control processing of the SSD 110.

The SSD 110 on which processing A1 has been performed in S302, and determination of "NO" has been made in S303 is still subject to the processing of FIGS. 7A to 7B. When processing A2 has been performed in S304, the cumulative number of times of Write processing on the SSD 110 is too large. Thus, the processing illustrated in FIGS. 7A to 7B is not performed afterwards on the SSD 110. In other words, when processing A2 has been performed in S304, the life of the SSD 110 has almost reached the end. The SSD 110 on which processing C has been performed in S306 is subject to processing of FIG. 7D to be described below.

Figure 7D:
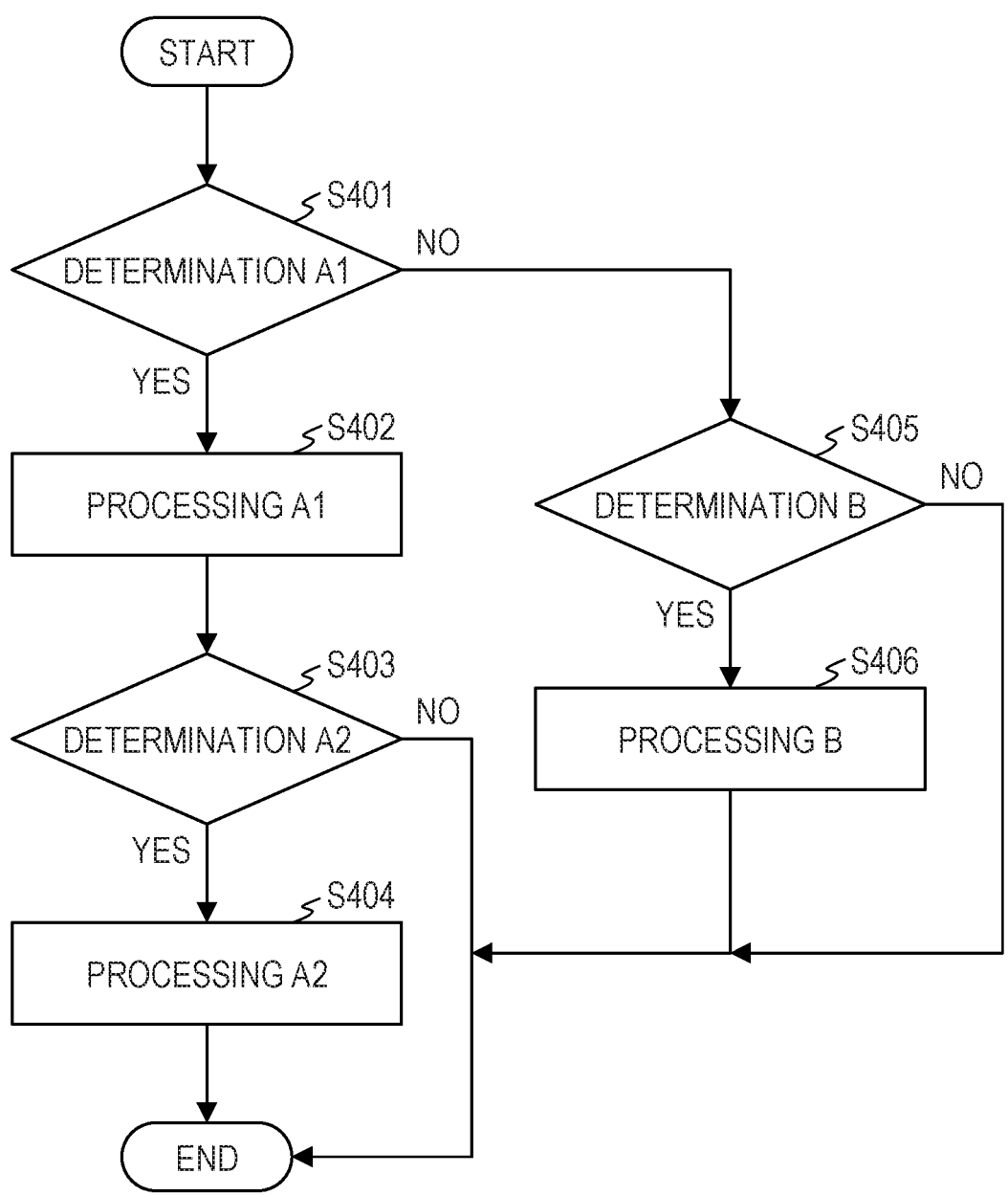
FIG. 7D is a flowchart illustrating an example of processing performed by a storage control device.

The SSD 110 on which processing C has been performed in S208 or S306 is subject to processing of FIG. 7D. The analysis unit 152 determines whether the cumulative number of times of Write processing on an SSD exceeds the cumulative Write threshold since initiation of the analysis (S401). The processing of S401 is "determination A1" described with reference to FIG. 1B. When it is determined that the cumulative number of times of Write processing on an SSD exceeds the cumulative Write threshold ("YES" in S401), the notification unit 153 notifies the storage apparatus 100 of an instruction that requests an allocation of the variable area 113 to the spare area 112 (S402). The processing of S402 is "processing A1" described with reference to FIG. 1B. The analysis unit 152 determines whether the cumulative number of times of Write processing on every SSD within the RAID exceeds the cumulative Write threshold (S403). The processing of S403 is "determination A2" described with reference to FIG. 1B. When it is determined that the cumulative number of times of Write processing on every SSD within the RAID exceeds the cumulative Write threshold ("YES" in S403), the notification unit 153 notifies the user that the life of the SSD 110 has almost reached the end (S404). The processing of S404 is "processing A2" described with reference to FIG. 1B. When it is determined that the cumulative number of times of Write processing on at least one SSD within the RAID does not exceed the cumulative Write threshold ("NO" in S403), the storage control device 150 terminates the control processing of the SSD 110. When the processing of S404 is completed, the storage control device 150 terminates the control processing of the SSD 110.

When it is determined that no cumulative number of times of Write processing on the respective SSD exceeds the cumulative Write threshold ("NO" in S401), the analysis unit 152 determines whether the number of times of Read processing performed on the SSD 110 within a predetermined time period exceeds the Read threshold (S405). The processing of S405 is "determination B" described with reference to FIG. 1C. When it is determined that the number of times of Read processing performed on the SSD 110 within the predetermined time period exceeds the Read threshold ("YES" in S405), the notification unit 153 notifies the storage apparatus 100 of a request for executing an Unmap command to increase the capacity of the spare area (S406). The processing of S406 is "processing B" described with reference to FIG. 1C. When the processing of S406 is completed, the storage control device 150 terminates the control processing of the SSD 110. When it is determined that the number of times of Read processing performed on the SSD 110 within the predetermined time period does not exceed the Read threshold ("NO" in S405), the storage control device 150 terminates the control processing of the SSD 110.

The SSD 110 on which processing A1 has been performed in S402, and determination of "NO" has been made in S403 is still subject to the processing of FIGS. 7A to 7B. When processing A2 has been performed in S404, the cumulative number of times of Write processing on the SSD 110 is too large. Thus, afterwards, the processing illustrated in FIGS. 7A to 7B is not performed afterwards on the SSD 110. In other words, when processing A2 has been performed in S404, the life of the SSD 110 has almost reached the end. The SSD 110 on which processing B has been performed in S406 is subject to processing of FIG. 7C.

In the SSD 110 in which the number of times of Read processing within the predetermined time period exceeds the Read threshold, the capacity of the main area 111c is increased and the capacity of the spare area 112c is decreased. This suppresses an occurrence of a difficulty in handling the spare area 112c that is not used in the background processing. Therefore, the SSD 110 in an environment with a lot of Read processing may efficiently exhibit its performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A storage control device, comprising:
a first storage device configured to
store therein management information used for managing a variable area of storage regions provided to a second storage device included in a storage apparatus, the storage regions each being allocated to either one of a main area and a spare area, the variable area including storage regions allocated to the spare area and allocatable to the main area, the main area being used for storing data, the spare area serving as a reserve area of the main area; and
a processor configured to
acquire, from the storage apparatus, information on numbers of times of Read processing on the second storage device and numbers of times of Write processing on the second storage device, and
notify the storage apparatus, when a number of times of Read processing on the second storage device within a predetermined time period is larger than a first predetermined threshold, of a request for allocating a first portion of the variable area to the main area on basis of the management information.

2. The storage control device according to claim 1, wherein the processor is configured to
notify the storage apparatus, when a cumulative number of times of Write processing on a first storage unit is larger than a second predetermined threshold, of a request for allocating a second portion of the main area to the spare area, the first storage unit being one of storage units constituting the second storage device, and
store, in the first storage device, information indicating that the second portion is included in the variable area.

3. The storage control device according to claim 1, wherein the processor is configured to
notify the storage apparatus, when a number of times of Write processing on the second storage device within the predetermined time period is larger than a second predetermined threshold, of a request for allocating a second portion of the main area to the spare area, and
store, in the first storage device, information indicating that the second portion is included in the variable area.

4. The storage control device according to claim 1, wherein
the storage apparatus implements a function of automated storage tiering, and
the second storage device is arranged at a top tier.

5. A storage system, comprising:
a storage apparatus including:
a storage device provided with
storage regions each allocated to either one of a main area used for storing data and a spare area serving as a reserve area of the main area, and
a second processor configured to
allocate a first portion of a variable area of the storage regions to the main area upon receiving a first request for allocating the first portion to the main area, the variable area including storage regions allocated to the spare area and allocatable to the main area; and
a storage control device including:
a first processor configured to
acquire, from the storage apparatus, information on numbers of times of Read processing on the storage device and numbers of times of Write processing on the storage device, and
notify the storage apparatus, when a number of times of Read processing on the storage device within a predetermined time period is larger than a first predetermined threshold, of the first request on basis of management information used for managing the variable area.

6. The storage system according to claim 5, wherein the first processor is configured to
notify the storage apparatus, when a cumulative number of times of Write processing on a first storage unit is larger than a second predetermined threshold, of a request for allocating a second portion of the main area to the spare area, the first storage unit being one of storage units constituting the storage device, and the second processor is configured to allocate the second portion to the spare area.

7. The storage system according to claim 5, wherein the first processor is configured to notify the storage apparatus, when a number of times of Write processing on the storage device within the predetermined time period is larger than a second predetermined threshold, of a request for allocating a second portion of the main area to the spare area, and the second processor is configured to allocate the second portion to the spare area.

8. The storage system according to claim 6, wherein the second processor is configured to allocate the second portion to the spare area by executing an Unmap command among small computer system interface (SCSI) commands on the second portion.

9. The storage system according to claim 5, wherein the second processor is configured to allocate the first portion to the main area by writing data on the first portion.

10. The storage system according to claim 5, wherein the storage apparatus implements a function of automated storage tiering, and the storage device is arranged at a top tier.

11. A computer-readable recording medium having stored therein a program that causes a computer to execute a process, the process comprising:

acquiring, from a storage apparatus, information on numbers of times of Read processing on a storage device included in the storage apparatus and numbers of times of Write processing on the storage device, the storage device being provided with storage regions each allocated to either one of a main area used for storing data and a spare area serving as a reserve area of the main area; and notifying the storage apparatus, when a number of times of Read processing on the storage device within a predetermined time period is larger than a first predetermined threshold, of a request for allocating a first portion of a variable area of the storage regions to the main area on basis of management information, the variable area including storage regions allocated to the spare area and allocatable to the main area.

12. The computer-readable recording medium according to claim 11, the process further comprising:

notifying the storage apparatus, when a cumulative number of times of Write processing on a first storage unit is larger than a second predetermined threshold, of a request for allocating a second portion of the main area to the spare area, the first storage unit being one of storage units constituting the storage device; and storing, in the management information, information indicating that the second portion is included in the variable area.

13. The computer-readable recording medium according to claim 11, the process further comprising:

notifying the storage apparatus, when a number of times of Write processing on the storage device within the predetermined time period is larger than a second predetermined threshold, of a request for allocating a second portion of the main area to the spare area; and storing, in the management information, information indicating that the second portion is included in the variable area.

14. The computer-readable recording medium according to claim 11, wherein the storage apparatus implements a function of automated storage tiering, and the storage device is arranged at a top tier.

* * * * *